(12) United States Patent
Player

(10) Patent No.: US 12,312,549 B2
(45) Date of Patent: May 27, 2025

(54) METHOD OF PRODUCING A SOLID BIOMASS-BASED FUEL

(71) Applicant: Tyler Player, Presque Isle, ME (US)

(72) Inventor: Tyler Player, Presque Isle, ME (US)

(*) Notice: Subject to any disclaimer, the term of this patent is extended or adjusted under 35 U.S.C. 154(b) by 0 days.

(21) Appl. No.: 18/199,182

(22) Filed: May 18, 2023

(65) Prior Publication Data

US 2024/0084209 A1   Mar. 14, 2024

Related U.S. Application Data

(60) Provisional application No. 63/406,057, filed on Sep. 13, 2022.

(51) Int. Cl.
*C10L 5/44*       (2006.01)

(52) U.S. Cl.
CPC .......... *C10L 5/44* (2013.01); *C10J 2300/0916* (2013.01)

(58) Field of Classification Search
CPC ........ C10L 2290/148; C10L 5/44; C10L 9/00; C10L 9/08; C10J 2300/0916
See application file for complete search history.

(56) References Cited

U.S. PATENT DOCUMENTS

| 4,590,688 A * | 5/1986 | Steffero, Sr. | ............. D21F 5/10 34/119 |
| 2015/0041574 A1* | 2/2015 | Anderson | ............. D21B 1/026 241/43 |

FOREIGN PATENT DOCUMENTS

WO    WO-03024633 A1 *   3/2003   ............. A61L 11/00

* cited by examiner

*Primary Examiner* — Latosha Hines

(57) ABSTRACT

A safe and economical method for creating a solid fuel product from biomass-based materials. The method uses a horizontally oriented rotating pressure vehicle to essentially steam-cook the biomass-based materials over a period of time, slowly and safely releasing the steam after the process is complete.

18 Claims, 2 Drawing Sheets

METHOD OF PRODUCING A SOLID BIOMASS-BASED FUEL

BACKGROUND INFORMATION

Field of the Invention

The invention relates to methods for turning typical organic waste from cellulose and other similarly based products into a water resistant fuel product.

Discussion of Prior Art

Fossil fuels such as coal, oil, and natural gas make up a large percentage of the world's energy sources, with the National Academy of Sciences estimating that fossil fuels account for more than 80 percent of the total energy used in the United States alone. Unfortunately, fossil fuels are responsible for nearly three quarters of the emissions from human activities in the last 20 years, and they are essentially non-renewable with it taking millions of years to form each type of fuel.

Meanwhile, biomass is a plant-based material that is a renewable fuel source that may be used to produce heat or electricity. Examples of biomass include wood and wood residues, energy crops, agricultural residues, and waste from industry, farms and households. While many types of biomass may be used as fuel in their natural states, most are not naturally in their most energy efficient form or suitable for large energy generation. Specifically, most contain an amount of moisture content that, if reduced or eliminated, significantly increases the energy density of the product. In many industries, this process is known as beneficiation, the process of improving the value of a product by removing certain properties, such as in the mining industry where, for example, gangue minerals are removed from ore so as to create a higher grade product known as ore concentrate.

With coal being one of the largest and most common sources of fuel for generating electric power and heat, it is particularly advantageous to beneficiate biomass to resemble hard coal to be used in existing coal-fired power plants.

One approach to this form of beneficiation has been to use explosive steam pressure on thoroughly washed wood products in order to effectively flash cook the wet raw wood products, which turns the raw wood product into a form of pellet that largely resembles hard coal. This process is disclosed in U.S. Pat. No. 10,858,607 (the '607 patent'). Specifically, the '607 patent is directed towards a method that uses a "steam explosion process" that uses a rapid release of pressure to, evidently, cause the biomass products to convert into a solid fuel product resembling coal. See, e.g., '607 patent Col. 2 Lines 6-15.

This process, however, is hazardous and has high economic and environmental costs. More specifically, the steam explosion itself is a hazard and small error in operation may lead to a mechanical explosion that is extremely harmful to operators and others in the area as well as to the machinery. And, the water deployed in the process, both in terms of pre-processing as well as in executing the steam explosion, greatly increases the cost of the process and also drains local resources.

What is needed, therefore, is a method of creating a solid biomass-based fuel product in a safe and economical manner.

BRIEF SUMMARY OF THE INVENTION

The invention is a safe and economical method for creating a solid fuel product from biomass-based materials. The method uses a horizontally oriented rotating pressure vehicle to essentially steam-cook the biomass-based materials over a period of time. Once the required time has passed, the steam from the pressure vessel is slowly and safely released back down to atmospheric pressure, at which point the biomass-based materials have been converted into a solid fuel product that has appearance and approximate fuel capacity of sub-bituminous coal.

However, while the resulting fuel product resembles coal, because it is made from a biomass-based product, the benefits to the environment are massive, including close to a 100% effective reduction in greenhouse gases from a coal fired power plant, in addition to the fact that the product is a renewable source of fuel. For example, the method may use waste wood that is not otherwise used as the biomass-based material used to create the fuel. The resulting fuel product is also essentially immune to rain and other weather, making the handling and storage of the product much easier than, for example, conventional wood pellets.

There is little to no pre-processing required for the input materials so long as they are in the appropriate size. While that size may vary depending on the construction of the pressure vessel, it is generally sufficient if the dimensions of the input materials are all under three inches. In general, no other pre-processing or pre-conditioning is necessary. Once the pressure vessel is filled, it is closed and the steam pressure is brought to the desired level. The biomass materials are then essentially cooked as the pressure vessel rotates, the rotation allowing for a relatively even distribution of heat to material to create a consistent fuel product. Once the desired "cook time" has passed, the steam pressure is released at a relatively slow and controlled rate, typically over a period of 5 to 10 minutes, after which the fuel product is ready for use. The method also requires significantly less water than previously known methods.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
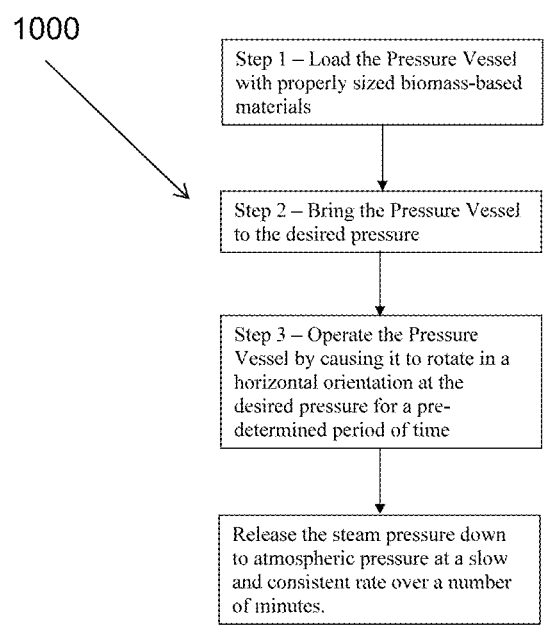
FIG. 1 is a flow chart illustrating the steps of the method according to the invention

FIG. 1 illustrates a method 1000 of producing a solid biomass-based fuel product according to the invention. In general, the method uses high-pressure steam over a period of time to convert typical organic wastes from cellulose and other similar base products into a water resistant fuel product. That resulting fuel product has a high-energy density that is comparable to sub-bituminous coal, likely in the range of approximately 8,500 to approximately 12,500 British Thermal Units ("BTU") per pound of product.

Figure 2:
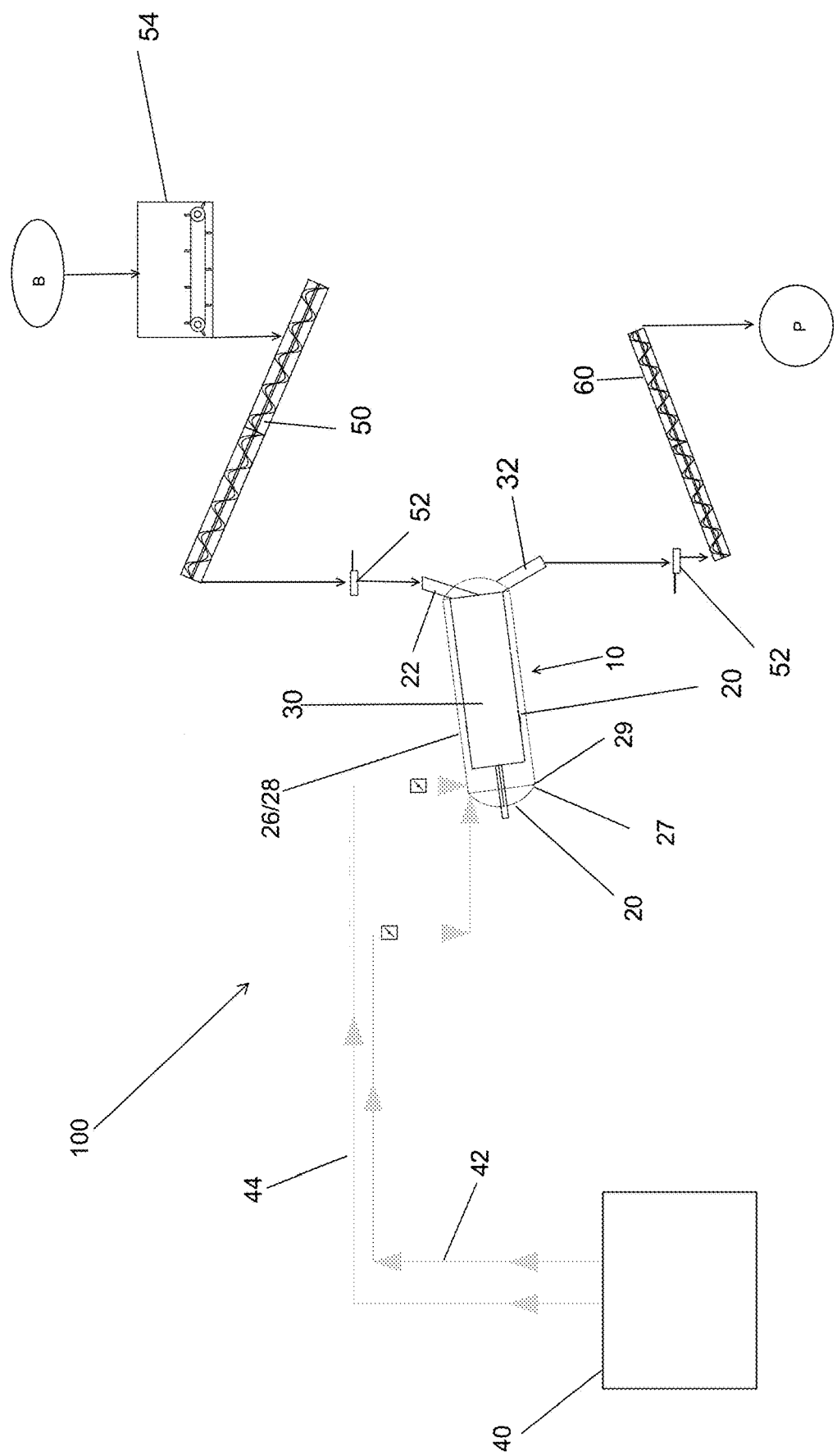
FIG. 2 is design diagram showing a system for use with the method.

The method uses a steam pressure system 100, illustrated in FIG. 2, which includes a horizontally rotating pressure vessel 10 to convert the materials into the solid fuel product. For example, a rotating autoclave is a suitable pressure vessel, or more particularly, a rotating inner drum autoclave ("RIDA"). Suitable RIDA's are conventionally manufactured and produced by a number of well-known company's such as, for example, Liberty Welding and Bartlett Engineering.

These conventional RIDA's are horizontally oriented, configured to provide a wide range of steam pressures pursuant to various operating parameters, and include a steam release valve that allows the slow and safe release of the steam pressure following operation of the RIDA. The size of the pressure vessel does not expressly matter to the performance of the method and is likely to be chosen based on the desired capacity. For example, one of the previously described RIDA's may be 25 feet in length with an 8-foot diameter, which is able to process about 10 tons of biomass products at a time. Again, the method is suitable for larger or smaller pressure vessels. The rotation of the pressure vessel ensures a relatively homogenous exposure to the steam, making a more consistent resulting fuel product.

The system 100 includes a boiler 40. The boiler is one that is able to provide high-pressure steam, where high-pressure steam is defined by the American Society of Mechanical Engineers as steam having a pressure of greater than 15 pounds per square inch ("PSI"), for a set duration of time. Such boilers are widely available on the commercial market. For example, the boiler may be one that is capable of producing up to 400 pounds per square gauge ("PSIG") steam. Such a boiler enables the system 100 to produce over 15,000 pounds of resulting product per hour. In general, a boiler that produces more steam is able to drive a system 100 having higher levels of production, while a boiler that produces less steam would, as expected, produce less product per hour. These types of commercially available boilers may be fueled by various sources, such as natural gas or a wood-fired unit.

In the embodiment shown, the horizontally oriented RIDA 10 includes an outer pressure vessel 20 and an inner rotational vessel 30. An infeed conveyer 40 provides raw biomass-based materials to the RIDA 10 past a slide gate 52 to the inlet 22 and into the inner vessel 30. Once the materials are inside the RIDA, a conventional steam boiler 40 provides steam into the outer vessel 20 to create a pressurized environment around the inner vessel 30 as the inner vessel 30 moves in a circular motion.

Two steam lines connect the boiler 40 to the outer vessel 20, a main line 42 and a pilot line 44. The main line 42 is configured to flood the outer vessel with steam to reach the desired pressure in a short amount of time, while the pilot line is a relatively smaller line that provides a relatively small amount of steam while the RIDA is running in order to maintain the desired pressure level within the vessel 20. A steam trap 29 is provided in the outer vessel 20 to discharge condensate during the operation of the method 1000.

The outer vessel 20 includes at least a first steam vent 26 for releasing steam at a constant and controlled rate. The first vent 26 may be described as a pilot vent or a pilot release valve, and it may be a conventional steam pressure release valve, for example, one that is configured in a cylindrical shape having a diameter of approximately between one and three inches, and preferably approximately two inches. A valve having this configuration is likely to release steam pressure at a rate of approximately 30-50 PSI per minute. As such, opening the first vent allows a relatively slow and constant release of steam out of the vessel 20 at a safe release rate.

A second steam vent 28 and a third steam vent 27 may also be provided. In this embodiment, the second steam vent 28 may be referred to as a main release valve 28 and may be significantly larger than the first vent 26, for example, the main release valve 28 may also be cylindrical in shape but have a diameter of between 7 and 9 inches and preferably around 8 inches. An opening the size of the second steam vent 28 allows for a high rate of release that is unsafe with a fully pressurized vessel, however, providing the main release valve 28 allows an operator to use the first vent 26 to initially release the steam pressure at a safe rate that is relatively slow and controlled until it reaches a safe level and then, once a safe pressure level has been reached, to use the second vent 28 to release the majority of the remaining pressure in a short amount of time. The third vent 27 may use a vacuum pump as the vessel may reach a point of counterbalance, and may also be beneficial as it may not be desirable to release this much pressure out as waste steam to the atmosphere.

Once the method is complete, an outfeed 32 is opened and the processed materials deposited from the inner vessel 30 on an outlet conveyer 60 where they are conveyed to an outfeed pile P.

More specifically, the first step in the method 1000 is to load the biomass products B into the pressure vessel 10, which is done using conventional means such as using the infeed conveyer 50 to deliver the materials from in infeed bin 54 through inline 22 into the inner rotational vessel 30. The biomass-based materials may be in any form and in their natural, non-treated, condition, such as dry wood chips having length, width, and height dimensions that are each less than approximately 3 inches. In essence, the only requirement is that the materials be comparatively small in size, such as wood chips as opposed to entire trees or tree limbs.

The second step in the method 1000 is to commence operation by bringing the outer vessel 20 to the desired steam pressure. For example, with the biomass material being a wood-based product and using a conventional RIDA, having the outer vessel 20 at a pressure of roughly 300 PSI is sufficient. After loading and sealing the RIDA, it takes approximately 10-15 minutes to reach a steam pressure of approximately 300 PSI by using the main line 42 to deliver steam from the boiler 40. Once the desired pressure is obtained, the main line 42 is closed and the pilot line 44 may be used to deliver a comparatively small amount of steam from the boiler 40 to the outer vessel 20 in order to maintain the desired pressure during operation of the inner rotational vessel 30. Other pressures are also suitable, for example, a pressure level in the range of approximately 150 PSI to approximately 400 PSI is sufficient, and lower levels of high pressure are also suitable.

The third step in the method is to allow the products to stay in the operating pressure vessel 10 as the inner rotational vessel 30 rotates for the necessary amount of time. The required "cook time" varies, however, 5 to 10 minutes is typically sufficient for the parameters described herein. More specifically, the required time varies in large part depending on the amount of pressure and the volume of material being processed. There are certain parameters where the cook time may be as low as 3 minutes.

The fourth step is to stop the RIDA and release the steam pressure back down to atmospheric pressure in a slow, controlled, and safe manner. Using conventional pressure relief valves described herein, the steam is released at a relatively constant rate over a period of 5 to 10 minutes with no bursts or sudden changes in the release rate at least until the pressure reaches a safe level that is typically in the 100-150 PSI range.

More specifically, the fourth step uses at least the pressure release pilot line 26 to release the steam pressure at a slow and controlled rate. As noted above, the pilot valve 26 may be a relatively small valve having a diameter between approximately 1 and 3 inches, which likely releases steam pressure at a rate of approximately of approximately 30-50 PSI per minute. The pilot valve 26 may be used to reduce the pressure level to a safe level, or it may be used to release effectively all of the steam from the vessel.

The fourth step may also use the second release valve 28 and/or the third release valve 27. For example, in the scenario described above, the pilot valve 26 may be used until the internal steam pressure level is between 100 and 150 PSI, after which the main line 28 may be used to reduce the majority of the remaining pressure or until the system reaches a counterbalance at which point the third line 27 may be used for the remaining steam.

Performing the method with a RIDA that is approximately 8 feet in diameter and that is about 25 feet long is able to process approximately 10 tons of wood per hour with an average cook time between 5 and 10 minutes per batch of input materials.

Suitable biomass-based materials for this process include, but are not limited to, raw wood products, such as chips, bark, sawdust, shavings, etc. Generally, all materials that are part, or were part, of a tree, much of which would otherwise become waste products during typical processing of lumber. The method is also applicable to other cellulose-based materials such as, for example, sugarcane and empty palm tree leftovers.

It is understood that the embodiments described herein are merely illustrative of the present invention. Variations in the construction of the method may be contemplated by one skilled in the art without limiting the intended scope of the invention herein disclosed and as defined by the following claims.

What is claimed is:

1. A method for creating a solid fuel product from biomass-based materials, the method comprising the steps of:
    providing a pressure vessel that includes an outer vessel and an inner vessel, the inner vessel configured as a rotational vessel;
    loading the biomass-based materials into the inner vessel, the biomass-based materials being wood chips having length, width, and height dimensions that are each less than approximately 3 inches;
    providing a boiler system that is configured to generate steam pressure and that has a direct connection to the pressure vessel;
    providing the pressure vessel with a predetermined amount of steam pressure directly from the boiler system;
    operating the pressure inner vessel by rotating the inner vessel to allow for a relatively even distribution of heat generated by the steam pressure to the biomass-based materials for a predetermined amount of time that is configured to allow the biomass-based materials to convert into the solid fuel product;
    after the predetermined amount of time cease operating the pressure vessel; and
    releasing the steam pressure out from the pressure vessel at a first release rate that is relatively constant and that is maintained for up to ten minutes and then a second release rate until the pressure inside the pressure vessel is reduced to approximately atmospheric pressure, and wherein the second release rate is greater than the first release rate;
    wherein the solid fuel product has an energy density of approximately 8,500 British Thermal Units to approximately 12,500 British Thermal Units.

2. The method of claim 1, wherein the outer vessel includes a first release valve that releases the pressure at the first release rate, the first release rate between approximately 30 pounds per square inch and approximately 50 pounds per square inch.

3. The method of claim 1, the method further including the step of: monitoring the pressure within the outer vessel as the pressure is released at the first release rate and when the pressure within the outer vessel reaches a predetermined release level opening the second release valve, the second release valve remaining open until the pressure inside the vessel is reduced to approximately atmospheric pressure.

4. The method of claim 3, wherein the predetermined amount of time is between five minutes and ten minutes.

5. The method of claim 4, wherein the predetermined amount of pressure is between 250 pounds per square inch and 350 pound per square inch.

6. The method of claim 3, wherein the predetermined release level is between 100 pounds per square inch and 150 pounds per square inch.

7. Method for creating a solid fuel product from biomass-based materials, the method comprising the steps of:
    providing a pressure vessel that includes an outer vessel and an inner vessel, the inner vessel configured as a rotational vessel;
    loading the biomass-based materials into the inner vessel, the biomass-based materials being wood chips having length, width, and height dimensions that are each less than approximately 3 inches;
    providing a boiler system that is configured to generate steam pressure and that has a direct connection to the pressure vessel;
    providing the pressure vessel with a predetermined amount of steam pressure directly from the boiler system;
    operating the pressure inner vessel by rotating the inner vessel to allow for a relatively even distribution of heat generated by the steam pressure to the biomass-based materials for a predetermined amount of time that is configured to allow the biomass-based materials to convert into the solid fuel product;
    after the predetermined amount of time cease operating the pressure vessel; and
    releasing the steam pressure out from the pressure vessel at a first release rate that is relatively constant and that is maintained until the steam pressure reaches a predetermined pressure level that is less than 150 PSI, and then a second release rate until the pressure inside the pressure vessel is reduced to approximately atmospheric pressure, and wherein the second release rate is greater than the first release rate;
    wherein the solid fuel product has an energy density of approximately 8,500 British Thermal Units to approximately 12,500 British Thermal Units.

8. The method of claim 7, wherein the outer vessel includes a first release valve that releases the pressure at the first release rate, the first release rate between approximately 30 pounds per square inch and approximately 50 pounds per square inch.

9. The method of claim 7, the method further including the step of: monitoring the pressure within the outer vessel as the pressure is released at the first release rate and when the pressure within the outer vessel reaches a predetermined release level opening the second release valve, the second release valve remaining open until the pressure inside the vessel is reduced to approximately atmospheric pressure.

10. The method of claim 9, wherein the predetermined amount of time is between five minutes and ten minutes.

11. The method of claim 10, wherein the predetermined amount of pressure is between 250 pounds per square inch and 350 pound per square inch.

12. The method of claim 9, wherein the predetermined release level is between 100 pounds per square inch and 150 pounds per square inch.

13. A method for creating a solid fuel product from biomass-based materials, the method comprising the steps of:
providing a pressure vessel that includes an outer vessel and an inner vessel, the inner vessel configured as a rotational vessel;
loading the biomass-based materials into the inner vessel, the biomass-based materials being wood chips having length, width, and height dimensions that are each less than approximately 3 inches;
providing a boiler system that is configured to generate steam pressure and that has a direct connection to the pressure vessel;
providing the pressure vessel with a predetermined amount of steam pressure directly from the boiler system;
operating the pressure inner vessel by rotating the inner vessel to allow for a relatively even distribution of heat generated by the steam pressure to the biomass-based materials for a predetermined amount of time that is configured to allow the biomass-based materials to convert into the solid fuel product;
after the predetermined amount of time cease operating the pressure vessel; and
releasing the steam pressure out from the pressure vessel through a first release valve that has a diameter of less than 3 inches until the steam pressure reaches a predetermined level, and then releasing the remaining pressure through a second release valve, the second release valve having a diameter greater than the first release valve;
wherein the solid fuel product has an energy density of approximately 8,500 British Thermal Units to approximately 12,500 British Thermal Units.

14. The method of claim 13, wherein the outer vessel includes a first release valve that releases the pressure at the first release rate, the first release rate between approximately 30 pounds per square inch and approximately 50 pounds per square inch.

15. The method of claim 13, the method further including the step of: monitoring the pressure within the outer vessel as the pressure is released at the first release rate and when the pressure within the outer vessel reaches a predetermined release level opening the second release valve, the second release valve remaining open until the pressure inside the vessel is reduced to approximately atmospheric pressure.

16. The method of claim 15, wherein the predetermined amount of time is between five minutes and ten minutes.

17. The method of claim 16, wherein the predetermined amount of pressure is between 250 pounds per square inch and 350 pound per square inch.

18. The method of claim 16, wherein the predetermined release level is between 100 pounds per square inch and 150 pounds per square inch.

* * * * *